United States Patent
Thum et al.

(10) Patent No.: US 10,969,039 B2
(45) Date of Patent: Apr. 6, 2021

(54) MULTILAYERED FLEXIBLE HOSE

(71) Applicant: ContiTech Schlauch GmbH, Hannover (DE)

(72) Inventors: Michael Thum, Korbach (DE); Martin Sinemus, Diemelstadt (DE); Lars Doering, Korbach (DE)

(73) Assignee: ContiTech Schlauch GmbH, Hannover (DE)

( * ) Notice: Subject to any disclaimer, the term of this patent is extended or adjusted under 35 U.S.C. 154(b) by 0 days.

(21) Appl. No.: 16/643,312

(22) PCT Filed: Jun. 12, 2018

(86) PCT No.: PCT/EP2018/065414
§ 371 (c)(1),
(2) Date: Feb. 28, 2020

(87) PCT Pub. No.: WO2019/048095
PCT Pub. Date: Mar. 14, 2019

(65) Prior Publication Data
US 2020/0400252 A1   Dec. 24, 2020

(30) Foreign Application Priority Data

Sep. 11, 2017 (DE) ...................... 10 2017 215 964.2

(51) Int. Cl.
| F16L 11/10 | (2006.01) |
| B32B 1/08 | (2006.01) |
| B32B 7/12 | (2006.01) |
| B32B 25/10 | (2006.01) |
| B32B 25/14 | (2006.01) |

(52) U.S. Cl.
CPC ................ *F16L 11/10* (2013.01); *B32B 1/08* (2013.01); *B32B 7/12* (2013.01); *B32B 25/10* (2013.01); *B32B 25/14* (2013.01); *B32B 2307/5825* (2013.01); *B32B 2597/00* (2013.01)

(58) Field of Classification Search
CPC ... F16L 11/10; B32B 1/08; B32B 7/12; B32B 2597/00

USPC ...... 138/123–126, 137, 141; 428/36.91, 36.9
See application file for complete search history.

(56) References Cited

U.S. PATENT DOCUMENTS

| 8,715,801 | B2 * | 5/2014 | Yamakawa | ............. B32B 27/34 |
| | | | | 428/36.91 |
| 2005/0255773 | A1 | 11/2005 | Klang et al. | |
| 2008/0020619 | A1 * | 1/2008 | Shigeta | ................ H01R 13/521 |
| | | | | 439/271 |
| 2008/0072984 | A1 | 3/2008 | Branch et al. | |
| 2018/0273721 | A1 * | 9/2018 | Singh | ....................... C08K 3/22 |

FOREIGN PATENT DOCUMENTS

| EP | 1493956 A1 | 1/2005 |
| EP | 1745079 A1 | 1/2007 |
| EP | 2006947 A1 | 6/2009 |
| JP | 4837817 B2 | 12/2011 |

OTHER PUBLICATIONS

International Search Report dated Nov. 10, 2018 of International Application PCT/EP2018/065414 on which this application is based.

* cited by examiner

*Primary Examiner* — Patrick F Brinson
(74) *Attorney, Agent, or Firm* — David L. Cate; Gregory Adams

(57) ABSTRACT

The invention relates to a multilayer flexible hose, especially a multilayer flexible brake hose.
The hose has the following layer structure:
  a single-ply or multi-ply outer layer based on at least one elastomer and
  at least one single-ply or multi-ply textile strength member layer and
  at least one single-ply or multi-ply textile adhesive layer, wherein the adhesive layer contains as the adhesive at least one zinc(II) salt of acrylic acid and/or at least one zinc(II) salt of methacrylic acid and/or at least one zinc(II) salt of monomethacrylic acid and
  a single-ply or multi-ply inner layer based on at least one elastomer.

7 Claims, No Drawings

MULTILAYERED FLEXIBLE HOSE

The invention relates to a multilayer flexible hose, especially a multilayer flexible brake hose.

Brake hoses are used in brake systems of motor vehicles in order to generate, via the brake pedal, a static brake fluid column which is intended to transfer the pressure without loss to the wheel brake cylinder. The transfer of the force expended by the foot in the brake hoses or brake lines is frictionless and free of loss. Flexible transitions are needed in bridging the gap from the vehicle body to the wheels, i.e. the brake cylinders, in order to create balancing between compression and rebound. For this purpose, generally flexible brake hoses having at least one layer based on at least one rubber mixture and at least one strength member layer are installed. Compared to rigid brake lines, they are extensible, and this property varies with alternating ambient conditions. The change in volume in the flexible brake hoses is balanced via the pedal travel, which results in a constantly varying pressure point.

For the constantly changing temperature, volume and pressure values, it is necessary for the hose to have a defined minimum value for the adhesion of the individual layers over its entire lifetime. Only then can impeccable and safe functioning of the brake hose be assured. Specific bonding systems are generally used for this adhesion of the individual layers to one another.

The bonding system used is generally a resorcinol-formaldehyde system which thus constitutes the current state of the art in the rubber-processing industry. Resorcinol-formaldehyde bonding systems in elastomer mixtures are frequently also referred to as RFS (resorcinol-formaldehyde-silica), and aqueous polymer dispersions as RFL (resorcinol-formaldehyde-latex).

Particularly the adhesion between resorcinol-formaldehyde systems (RF systems) and EPDM elastomer can at best be regarded as average. By contrast, no binding at all occurs between EPM elastomer and RF systems.

The resorcinol and formaldehyde components of the bonding system are classified as being harmful to the environment and health. The use of the two substances is therefore likely to be significantly restricted and/or associated with stringent regulations in the next few years.

It is therefore an object of the present invention to provide a multilayer flexible hose, especially a multilayer flexible brake hose, that features improved adhesion of the individual layers, especially adhesion between a strength member layer and a layer based on at least one elastomer, and meets the demands of the applicable test standards.

This object is achieved in that the multilayer flexible hose has at least the following layers:
a single-ply or multi-ply outer layer based on at least one elastomer and
at least one single-ply or multi-ply textile strength member layer and
at least one single-ply or multi-ply textile adhesive layer, wherein the adhesive layer contains as the adhesive at least one zinc(II) salt of acrylic acid and/or at least one zinc(II) salt of methacrylic acid and/or at least one zinc(II) salt of monomethacrylic acid and
a single-ply or multi-ply inner layer based on at least one elastomer.

It has been found that an adhesive layer comprising at least one zinc(II) salt of the acids mentioned distinctly improves the adhesion between the layers, and the demands on dynamic performance are met.

In a preferred embodiment, it is thus possible to partly or entirely dispense with the use of RF systems in the adhesive layer. The amount of RF systems in the adhesive layer is more preferably 0 phr.

The outer layer and the inner layer may be the same or different from one another with regard to their quantitative and/or qualitative composition. They may each be in single-ply or multi-ply form.

For achievement of the highest possible flexibility, the two layers are constructed on the basis of at least one elastomer and further mixture ingredients. The elastomer may comprise rubbers and/or thermoplastic elastomers that may be used alone or in combination.

Particular mention should be made of the following rubber components: ethylene-propylene copolymer (EPM), ethylene-propylene-diene monomer copolymer (EPDM), nitrile rubber (NBR), (partially) hydrogenated nitrile rubber (HNBR), fluoro rubber (FPM or FKM), chloroprene rubber (CR), natural rubber (NR), styrene-butadiene rubber (SBR), isoprene rubber (IR), butyl rubber (IIR), bromobutyl rubber (BIIR), chlorobutyl rubber (CIIR), butadiene rubber (BR), chlorinated polyethylene (CM), chlorosulfonated polyethylene (CSM), polyepichlorohydrin (ECO), ethylene-vinyl acetate rubber (EVA), acrylate rubber (ACM), silicone rubber (MVQ), fluorinated methylsilicone rubber (MFQ), perfluoro rubber (FFPM or FFKM), polyurethane (PU). Of particular significance are EPM or EPDM since these have particularly good stability with respect to the brake fluid.

The mixture ingredients include at least one crosslinker or a crosslinker system. Further additional mixture ingredients are usually a filler and/or a processing auxiliary and/or a plasticizer and/or an aging stabilizer, and also optionally further additives (e.g. fibers, color pigments). Reference is made here too to the general art of rubber mixing technology.

The strength member layer may be in single-ply or multi-ply form. Materials used for the textile strength member layer may be any of the suitable materials known in the art, which are preferably selected from the group consisting of: polyamide (PA), e.g. PA6, PA6.6, PA11, PA12, PA6.10, PA6.12, and/or copolyamides and/or polyesters (PES) and/or rayon and/or polyethylene terephthalate (PET) and/or polyethylene naphthalate (PEN) and/or polybutylene terephthalate (PBT) and/or polycarbonate (PC) and/or unsaturated polyester resin (UP) and/or poly(1,4-cyclohexanedimethylene terephthalate) (PCDT) and/or cotton and/or spun rayon and/or polyvinyl alcohol (PVAL) and/or polyoxybenzonaphthoate and/or polyvinyl acetal (PVA) and/or polyetheretherketone (PEEK) and/or polyethylene 2,6-naphthalate (PEN) and/or polyphenylene and/or polyphenylene oxide (PPO) and/or polyphenylene sulfide (PPS) and/or polyphenylene ether and/or polybenzoxazole (PBO) and/or polyoxadiazole (POD) and/or polyetherimide (PEI) and/or m-aramid and/or p-aramid and/or glass and/or basalt and/or metal and/or carbon and/or ceramic and/or carbon and/or wool and/or cotton and/or polypropylene and/or melamine and/or modified viscose and/or stone and/or highly crystalline polymer fibers and/or fluoropolymers, for example fluorosilicone, polytetrafluoroethylene (PTFE) and perfluoroethylenepropylene (FEP), and/or fluoro copolymers, for example poly(vinylidene fluoride-co-hexafluoropropylene) (VDF/HFP), poly(vinylidene fluoride-co-hexafluoropropylene-co-tetrafluoroethylene) (TFB), poly(vinylidene fluoride-co-tetrafluoroethylene-co-perfluoromethyl vinyl ether) (VDF/TFE/PMVE), poly(tetrafluoroethylene-co-propylene) (TFE/P) and poly(vinylidene fluoride-co-chlorotrifluoroethylene) (VDF/CTFE).

The materials for the strength member layer may be used here alone or in combination, meaning that what are called hybrid systems are also possible.

Especially for brake hoses, preference is given to using materials having particularly good dynamic performance alone or in combination, and simultaneously exhibiting a small increase in volume, for example PVAL or rayon or PES or aramid.

The textile strength member layer here may have been modified with at least one adhesion promoter, for example adhesion-promoting dip. In the context of the present invention, however, it is preferable when the textile strength member layer is free of any adhesion-promoting modification, especially free of RF systems, meaning that the amount of adhesion promoter, especially RF systems, in the textile strength member layer is 0 phr.

The strength member layer may be a weave, loop-formed knit, braid or loop-drawn knit.

It is essential to the invention that the hose contains at least one single-ply or multi-ply textile adhesive layer, wherein the adhesive layer contains as the adhesion promoter at least one zinc(II) salt of acrylic acid and/or at least one zinc(II) salt of methacrylic acid and/or at least one zinc(II) salt of monomethacrylic acid.

The total amount of the adhesion promoters mentioned, which may be used alone or in combination, is preferably 10 to 100 phr, more preferably 20 to 80 phr and most preferably 20 to 50 phr.

The composition of the adhesive layer is preferably the same in terms of its qualitative and/or quantitative constituents, especially with regard to the type and amount of rubber, filler and crosslinking agent, except for the adhesion promoter mentioned and the co-agents required for peroxidic crosslinking. This further reduces the complexity during the production of the hose.

The adhesive layer preferably contains at least one peroxide as vulcanizing agent. Particularly by virtue of the combination of the adhesives mentioned and the peroxide, an additional acrylate-polymer network that binds to the textile strength members is achieved. This network, as well as the rigid covalent bonds, also has flexible ionic bonds and hence guarantees the dynamic performance of the hose.

The total amount of peroxide is preferably 3 to 7 phr, more preferably 3 to 6 phr, most preferably 4 to 5 phr.

In a preferred embodiment, the adhesive layer also contains at least one filler. This may be any of the fillers known to the skilled person, for example carbon black, graphite, carbon nanotubes (CNTs), silica, calcium and aluminum silicates, kieselguhr, kaolin, limestone, zeolites, cyclodextrins, feldspar and/or talc, chalk, alumina gel, fibers (short and long fibers, glass, carbon or aramid fibers), whiskers (aluminum oxide, silicon carbide), mica, magnetite, zinc oxide, core/shell fillers, asphalt, hard rubber dust, chlorides, carbonates, sulfates, oxides and hydroxides of alkali metals and alkaline earth metals, $Al(OH)_3$, PVC, polymer powder (e.g. PE or PTFE powder), factice, inorganic and organic pigments, organic or inorganic acids, glass beads, sawdust, nutshell flour, each of which may be used alone or in combination. It has been found that, surprisingly, the use of chalk leads to improved adhesion and that it is simultaneously possible here to partly or entirely dispense with the use of solvents.

The adhesive mixture may be applied during the production of the hose as an extruded or co-extruded layer, as a calendered sheet or in the form of a rubber solution.

The hose may also additionally contain at least one further interlayer, preferably based on at least one rubber.

The hose may preferably be a brake hose, clutch hose, cooling water hose, delivery hose, refuelling hose, chemical hose, heatable hose, drinking water hose, food product hose, manifold hose, fuel hose, offshore and marine hose, bunker hose, air conditioning hose or paint spraying hose.

The invention is now to be elucidated in detail with reference to comparative examples and working examples, which are summarized in tables 1a and 1b.

Table 1a shows the properties of the T test using a concentration series with zinc diacrylate (ZDA) on the laboratory scale.

An adhesive layer based on an EPDM rubber and with different amounts of ZDA in each case was applied here to a textile strength member made of PVAL. The textile strength member here has been equipped in one case with an RF system dip and in one case does not contain an RF system dip.

What is called the T test according to ASTM D2229 is an adhesion test between textile strength member insert and rubber mixture. The T test ascertains static adhesion. In this test, the filaments to be tested are placed into a rubber matrix which is then vulcanized under the influence of pressure and temperature. The force required to pull the filament out of the rubber at an angle of 90° is measured and is typically reported in newtons, where the width of the vulcanization block according to the filament thickness is 5 or 10 mm.

The values listed have been standardized to an adhesive layer without ZDA applied to a PVAL strength member with RF dip. Values greater than 100% thus represent improved adhesion.

Table 1b shows the separation force ascertained from the tear propagation resistance [N/mm] between a strength member layer of PVAL and the adhesive layer in a hose with an outer layer and an inner layer each made of a rubber mixture based on EPDM after thermal aging at 120° C. The values in one line are standardized here to the separation force as newly made.

TABLE 1a

| ZDA [phr] | PVAL Without RF dip [%] | PVAL With RF dip [%] |
|---|---|---|
| 0 | 57 | 100 |
| 5 | 91 | 104 |
| 10 | 113 | 100 |
| 20 | 132 | 104 |
| 30 | 132 | 111 |
| 40 | 119 | 117 |
| 50 | 134 | 128 |
| 75 | 111 | 121 |
| 100 | 113 | 96 |

TABLE 2b

| ZDA [phr] | PVAL RF dip | Separation force newly made [%] | Separation force after 166 h [%] | Separation force after 500 h [%] | Separation force after 1000 h [%] |
|---|---|---|---|---|---|
| 0 | Yes | 100 | 125 | 138 | 98 |
| 50 | Yes | 100 | 129 | 139 | 126 |
| 50 | no | 100 | 129 | 142 | 204 |

The invention claimed is:

1. A multilayer flexible hose comprising at least the following layer structure:

a single-ply or multi-ply outer layer based on at least one elastomer;

at least one single-ply or multi-ply textile strength member layer;

at least one single-ply or multi-ply textile adhesive layer, wherein the adhesive layer contains as an adhesive at least member of the group consisting of zinc(II) salt of acrylic acid, zinc(II) salt of methacrylic acid, zinc(II) salt of monomethacrylic acid, and any combination thereof; and, a single-ply or multi-ply inner layer based on at least one elastomer;

wherein the adhesive is zinc diacrylate incorporated in the adhesive layer in an amount equal to or greater than 10 phr; and, wherein tear propagation resistance between the strength member layer and the adhesive layer is at least 113 N/mm according to ASTM D2229 T test.

2. The multilayer flexible hose as claimed in claim 1, wherein the outer layer is based on at least one EPM or EPDM rubber.

3. The multilayer flexible hose as claimed in claim 1, wherein the inner layer is based on at least one EPM or EPDM rubber.

4. The multilayer flexible hose as claimed in claim 1, wherein the single-ply or multi-ply textile strength member layer is selected from the group consisting of rayon, PVAL, aramid, polyamide, and a hybrid variant of the materials mentioned.

5. The multilayer flexible hose as claimed in claim 1, wherein the adhesive layer is devoid of a resorcinol-formaldehyde system.

6. The multilayer flexible hose as claimed in claim 1, wherein tear propagation resistance between the strength member layer and the adhesive layer is at least 132 N/mm according to ASTM D2229 T test.

7. The multilayer flexible hose as claimed in claim 1 as incorporated into a brake hose.

* * * * *